United States Patent [19]
Patel et al.

[11] Patent Number: 5,909,779
[45] Date of Patent: Jun. 8, 1999

[54] OIL-BASED DRILLING FLUIDS SUITABLE FOR DRILLING IN THE PRESENCE OF ACIDIC GASES

[75] Inventors: Arvind D. Patel; Jayanti S. Patel; Harris A Oehler, all of Houston, Tex.

[73] Assignee: M-I L.L.C., Houston, Tex.

[21] Appl. No.: 09/108,025

[22] Filed: Jun. 30, 1998

Related U.S. Application Data

[60] Provisional application No. 60/057,038, Aug. 19, 1997.
[51] Int. Cl.⁶ .............................. E21B 21/00; E21B 49/00; C09K 7/06
[52] U.S. Cl. ........................... 175/50; 73/152.04; 175/65; 507/129; 507/910
[58] Field of Search .......................... 166/250.1; 175/40, 175/50, 65; 73/152.04, 152.43; 507/103, 129, 130, 203, 239, 910, 925

[56] References Cited

U.S. PATENT DOCUMENTS

| | | |
|---|---|---|
| 2,217,926 | 10/1940 | Van Campen ............................ 507/129 |
| 2,336,613 | 12/1943 | Horvitz .................... 175/50 X |
| 2,802,531 | 8/1957 | Cardwell et al. . |
| 2,900,336 | 8/1959 | Brown et al. . |
| 2,900,337 | 8/1959 | Earley et al. . |
| 3,372,112 | 3/1968 | Parker ..................................... 507/129 |
| 3,804,760 | 4/1974 | Darley . |
| 3,962,151 | 6/1976 | Dekker et al. . |
| 4,040,866 | 8/1977 | Mondshine . |
| 4,230,586 | 10/1980 | Bretz et al. . |
| 4,582,543 | 4/1986 | Bretz . |
| 4,615,813 | 10/1986 | Bretz . |
| 4,645,608 | 2/1987 | Rayborn . |
| 4,670,550 | 6/1987 | Bleeker et al. . |
| 4,735,731 | 4/1988 | Rose et al. . |
| 4,887,464 | 12/1989 | Tannenbaum et al. ............... 73/152.04 |
| 5,156,686 | 10/1992 | Van Slyke . |
| 5,189,012 | 2/1993 | Patel et al. ............................... 507/103 |
| 5,254,531 | 10/1993 | Mueller et al. ...................... 507/129 X |
| 5,403,820 | 4/1995 | Walker ..................................... 507/110 |
| 5,634,984 | 6/1997 | Van Slyke .................................. 134/40 |

FOREIGN PATENT DOCUMENTS

| | | |
|---|---|---|
| 2068129 | 7/1992 | Canada . |
| 0137538A2 | 4/1985 | European Pat. Off. . |
| 0226250A2 | 6/1987 | European Pat. Off. . |
| 0271943A2 | 6/1988 | European Pat. Off. . |
| 0382070A1 | 9/1989 | European Pat. Off. . |
| 0386636A1 | 3/1990 | European Pat. Off. . |
| 0382318A1 | 8/1990 | European Pat. Off. . |
| 2462436A1 | 2/1977 | Germany . |
| 3903784A1 | 6/1990 | Germany . |
| 2195685 | 12/1988 | United Kingdom . |
| WO87/02692 | 5/1987 | WIPO . |
| WO92/22622 | 12/1992 | WIPO . |
| WO93/16145 | 8/1993 | WIPO . |
| WO95/17244 | 6/1995 | WIPO . |

OTHER PUBLICATIONS

Kirk–Othmer, "Encyclopedia of Chemical Technology", Third Edition, vol. 1, A to Alkanolamines, pp. 944–960, 1978.
"Fine and Functional Chemicals", Nitrogen Derivatives, AKZO General Catalog. Copyright 1990.
"Quaternary Ammonium Compounds", Fine and Functional Chemicals, AKZO Catalog. Copyright 1990.
Lexis Search Dated May, 1, 1997, Citation List, 4 pages.
Chemical Abstracts Search Dated Apr. 2, 1997, 35 pages.
STN International Search. Chemical Abstracts and World Patent Index. Dated Apr. 9, 1997, 41 pages.

*Primary Examiner*—George Suchfield
*Attorney, Agent, or Firm*—Arnold White & Durkee

[57] ABSTRACT

An alkaline-reserve-free, oil-based drilling fluid is disclosed as comprising an oleaginous liquid, and an amine surfactant having the structure R-NH$_2$, wherein R represents a $C_{12}$–$C_{22}$ alkyl group or alkenyl group. Such fluid is particularly useful in the drilling of subterranean wells in which $CO_2$, $H_2S$ or other acidic gases which adversely effect the rheologies and other properties of the drilling fluid are encountered. The alkaline-reserve-free oil-based drilling fluid permits the logging of acidic gases which otherwise could not be logged in the presence of lime or other alkaline.

17 Claims, No Drawings

OIL-BASED DRILLING FLUIDS SUITABLE FOR DRILLING IN THE PRESENCE OF ACIDIC GASES

Priority of U.S. Provisional Patent Application entitled: "Oil-Based Drilling Fluids Suitable for Drilling", Provisional Application No: 60/057,038, filed Aug. 19, 1997 is claimed.

FIELD OF THE INVENTION

This invention relates to oil-based fluids suitable for use in drilling subterranean wells. More particularly the invention relates to oil-based drilling fluids used in drilling the oil and gas wells where acidic gases such as $CO_2$ or $H_2S$ are encountered during the drilling operation.

BACKGROUND OF THE INVENTION

The use of oil-based muds and drilling fluids has become increasingly popular since their introduction of the technology in the 1950's. Innovations in oil-based muds and drilling fluids are of on-going importance with the development of environmentally friendly drilling fluids and fluids having other special characteristics. Oil-based muds offer advantages over water-based muds in many drilling situations. In particular, oil-based muds are known in the art to provide excellent shale inhibition, borehole stability, lubricity, thermal stability, corrosion inhibition, tolerance of contamination and ease of maintenance. The selection of an oil-based drilling fluid, also known as oil-based mud involves a careful balance of both good and bad characteristics of such fluids in a particular application and the type of the oil or gas field in which the well is to be drilled.

Invert emulsion fluids or drilling muds are often utilized during the drilling of a subterranean well with an oil-based drilling fluid. Invert emulsion fluids generally include three major components, namely an oleaginous liquid which serves as a continuous phase, a non-oleaginous liquid which serves as a discontinuous phase and an emulsifying agent.

In addition to these three principle ingredients, lime or other alkaline materials are added to conventional invert emulsion fluids to maintain an alkaline reserve. The alkaline reserve is critical to maintaining the emulsion stability and the rheology of the conventional oil-based drilling fluid and thus the fluids usefulness in drilling. In some oil field areas, acidic gases such as $CO_2$ or $H_2S$ may be present in the formations penetrated by the well. These acidic gases can destabilize the invert emulsion causing the formation of a "flip-mud" which causes the immediate shut-down of drilling rig operations. The removal of flip mud from the well is costly and time consuming because the mud has a high viscosity. One of skill in the art should know that once a "flip-mud" has formed the invert emulsion fluid is considered to be useless and the components must be disposed of at great expense. Thus the role of the alkaline reserve, typically in the form of lime, is critical to prevent the formation of "flip-mud" and the accompanying instability and viscosity problems caused by acidic gases.

Although the inclusion of an alkaline reserve in the formulation of oil-based drilling fluids and invert emulsion is beneficial, sometimes it is desirable to log the amount of the acidic gases encountered during the drilling operation. The presence of the alkaline reserve inhibits the logging of acidic gases, in particular $CO_2$ and $H_2S$, because of the rapid acid/base reaction that takes place. Thus it would be desirable and useful if one could formulate an oil-based drilling fluid without use of lime or other alkaline reserve materials. In this way since the oil-based drilling fluid will not react with acidic gases, it could be utilized in fields in which acidic gas containing formations are known or suspected. This will allow the drill rig operator to accurately analyze the gases present in the mud by suitable means such as gas chromatography, gas sensitive probes or titration of such acidic gases as $CO_2$ and $H_2S$.

SUMMARY OF THE INVENTION

The present invention is generally directed to an alkaline-reserve-free, oil-based drilling fluid. Such a drilling fluid generally includes an oleaginous liquid, and an amine surfactant. One illustrative embodiment of the present invention is an oil-based drilling fluid including an oleaginous liquid and an amine surfactant, the surfactant being present in amounts sufficient to stabilize the rheology and the HTHP fluid loss properties of said oil-based drilling fluid in the presence of acidic gases. A preferred embodiment of the oil-based drilling fluid described above, the amine surfactant has the general formula:

$RNH_2$ wherein R represents a $C_{12}$–$C_{22}$ alkyl group, a $C_{12}$–$C_{22}$ alkenyl group or alkyl substituted cyclo alkyl group and more preferably R represents a straight or branched $C_{12}$–$C_{22}$ alkyl group, mixtures and unsaturated derivatives thereof.

Oil-based drilling fluids of the present invention may further include a weighting agent in a sufficient amount to give a drilling fluid having a density up to about 24 pounds per gallon. The oil-based drilling fluid of the present invention may also optionally include a viscosifying agent present in an amount of at least 0.01 percent by weight of said drilling fluid. Such oil-based drilling fluid may further include a surfactant which is selected from fatty acids, soaps of fatty acids, amido-amines, polyamides, polyamines, imidazoline derivatives, alkanol amines, oleate esters, organic phosphate esters, oxidized crude-tall oil, alkyl aromatic sulfonates and sulfates, or combinations and mixtures of these.

The oleaginous fluid utilized in the formulation of an oil-based drilling fluid of the present invention may be a natural or synthetic oil. Preferably the oleaginous fluid is selected from diesel oil, vegetable oil, animal oil, mineral oil, polyalphaolefins, long chain internal olefins, linear alpha olefins, silicone based fluids, linear paraffin oils, iso paraffin oils, or combinations thereof. One of skill in art would appreciate that the oleaginous fluid is the major component by volume of said illustrative drilling fluid.

Such a fluid may be particularly useful in the drilling of subterranean wells in which $CO_2$, $H_2S$ or other acidic gases which adversely effect the rheologies and other properties of the drilling fluid are encountered. The alkaline-reserve-free oil-based drilling fluid permits the logging of acidic gases which otherwise could not be logged in the presence of lime or other alkaline reserve materials.

Also within the scope of the present invention are invert emulsion fluids suitable for drilling formed with the above described oil-based drilling fluid. Thus one such invert emulsion drilling fluid is suitable for use in drilling oil and gas wells in oil fields in which acidic gases may be encountered includes an oleaginous fluid, a non-oleaginous fluid, and an amine surfactant. The amine surfactant should be present in amounts sufficient to stabilize the rheology and the HTHP fluid loss properties of said oil-based drilling fluid in the presence of acidic gases. The oleaginous fluid is selected from diesel oil, vegetable oil, animal oil, mineral oil, polyalphaolefins, long chain internal olefins, linear alpha olefins, silicone based fluids, linear paraffin oils, iso paraffin oils, or combinations thereof. The non-oleaginous fluid is an aqueous solution selected from fresh water, sea water, organic and inorganic salt solutions and brines, and mixtures thereof, The amine surfactant has the general formula:

wherein R represents a $C_{12}$–$C_{22}$ alkyl group, a $C_{12}$–$C_{22}$ alkenyl group or alkyl substituted cyclo alkyl group.

Invert emulsion drilling fluids of the present invention may further include a weighting agent which is present in an amount sufficient to give a invert emulsion drilling fluid a density up to about 24 pounds per gallon. Optionally, the invert emulsion drilling fluids of the present invention may also include a viscosifying agent which is present in an amount of at least 0.01 percent by weight of said drilling fluid. In addition to the previously listed components and optional components, an illustrative invert emulsion drilling fluid may further include a surfactant, said surfactant being selected from fatty acids, soaps of fatty acids, amido-amines, polyamides, polyamines, imidazoline derivatives, alkanol amines, oleate esters, organic phosphate esters, oxidized crude-tall oil, alkyl aromatic sulfonates and sulfates, or combinations and mixtures of these. In addition, the invert emulsion drilling fluid of this invention may contain fluid loss control additives. Illustrative fluid loss control additives may include modified lignite, polymers, oxidized asphalt, gilsonite, humates prepared by reacting humic acid with amides or polyalkyl polyamines, and other conventional fluid loss control agents.

DETAILED DESCRIPTION OF THE INVENTION

The present invention is generally directed to an oil-based fluid that is useful in the drilling of oil and gas wells. One advantage of the instant oil-based drilling fluids is that it may not be necessary to add lime or other basic material to the fluid when acidic gases such as $CO_2$ or $H_2S$ comes into contact with the fluid. The amine surfactant used in instant drilling fluid stabilizes the invert emulsion in the presence of an acidic gas environment particularly in the presence of $CO_2$. This is in contrast to a conventional oil-based mud or invert emulsion in which it is necessary to use lime or other alkalinity reserve in the drilling fluid to prevent the deterioration of the drilling fluid and the formation of a "flip mud". Thus it should be appreciated by one of skill in the art that the present invention, due to the absence of lime in the fluid, should allow the accurate logging of the acidic gases such as $CO_2$ or $H_2S$ encountered during the drilling operation.

In one embodiment of the present invention, the oil mud includes an oleaginous fluid, amine surfactant and weight material. The amine surfactant component should be selected so as to provide the unexpected results substantially described herein. The surfactant should be functionally able to form a rheologically stable oil-based fluid specifically at high temperature. Further contamination of the mud with acidic gases such as $CO_2$ or $H_2S$ should not have adverse effects on rheologies and HTHP fluid losses.

The oleaginous fluid utilized in the present invention may be preferably a liquid and more preferably may be a natural or synthetic oil. Such natural or synthetic oils may be selected from: diesel oil; vegetable oils such as rape seed oil, cotton seed oil, and the like; animal oils such as fish oil and the like; mineral oil; synthetic oil such as polyalphaolefins, long chain internal olefins, linear alpha olefins, silicone based fluids and the like; linear paraffin oils; isoparaffin oils; mixtures of these and liquids that should be known to one of skill in the art as being suitable for use as a drilling oil. The amount of oleaginous liquid may vary depending upon application. In one illustrative embodiment, the oleaginous fluid may be more than about 99% by volume of the drilling fluid and more preferably 100% oleaginous fluid may be used. One of skill in the art, however, would understand that some non-oleaginous fluid may be present in oil-based drilling fluid either through natural addition from a penetrated formation or by deliberate addition. Thus an invert emulsion, that is a water-in-oil emulsion may form and be utilized as the drilling fluid. One of skill in the art should understand that such embodiments are contemplated as being within the scope of the present invention.

As used herein, the term "amine surfactant" refers to compounds having the general structure $R-NH_2$ wherein R represents a $C_{12}$–$C_{22}$ alkyl group, a $C_2$–$C_{22}$ alkenyl group or alkyl substituted cyclo alkyl group. In one preferred illustrative embodiment, R represents a straight or branched $C_{12}$–$C_{22}$ alkyl groups, as well as mixtures and unsaturated derivatives thereof. In a more preferred illustrative embodiment, the unsaturated and saturated derivatives include soya alkylamine (Armeen-S™ available from AKZO). Many of the amines useful in the formulation of drilling fluids in accordance with the present invention are commercially available from AKZO under the trade name Armeen™ or they are commercially available from JETCO under the trade name Jet-Amine™.

It is believed that the amine surfactant of the instant invention functions as an emulsion and rheology stabilizer and controls the fluid losses at high temperature and high pressure in absence of lime. Further, it is believed that the amine surfactant helps in forming an invert emulsion should aqueous liquid be present in oil-based drilling fluid. An important property of the amine surfactants in the present invention is that they are not adversely effected by acidic gases such as $CO_2$ and $H_2S$ which may be encountered during the drilling of oil or gas wells. That is to say, upon exposure of the drilling fluid to such acidic gases, the ability of the surfactant to stabilize and invert emulsion is not adversely effected.

The amount of amine surfactant used in oil-based mud may vary depending upon the nature and amount of the oleaginous liquid and other surfactants used, type of oil well drilled and the types of contamination encountered during the drilling operation. In one illustrative embodiment the amount of amine surfactant may be at least about 0.1 percent by volume of the total weight of the drilling fluid. More preferably, the amine surfactant may be about 3 percent by weight of the total fluid.

Various other surfactants and wetting agents conventionally used in oil-based drilling fluids may optionally be incorporated in the fluids of this invention. Such surfactants may for example be, fatty acids, soaps of fatty acids, amido-amines, polyamides, polyamines, imidazoline derivatives, alkanol amines, oleate esters, organic phosphate esters, oxidized crude-tall oil, alkyl aromatic sulfonates and sulfates as well as mixtures of the above. Generally, such surfactants should be employed in an amount which does not interfere with the functionality of the fluid of this invention being used as drilling fluid.

Similarly, viscosifying agents, for example, organophillic clays, oil-soluble polymers such as styrene-butadiene copolymers and derivatives, polyamide resins, polycarboxylic acids and soaps of fatty acids may optionally be employed in the oil-based drilling fluid compositions of the present invention. In one of the preferred embodiment of this invention, commercially available styrene-butadiene copolymer, fluid loss control agent, available from Goodyear may be incorporated. The amount of viscosifying agent used in the composition will necessarily vary depending upon the end use of the composition and the desired viscosity of the fluid. One of skill in the art of drilling fluids should appreciate that as the amount of viscosifying agent increases, the fluid will become more viscous. Usually, viscosifying agents are employed in an amount which may be at least about 0.01 percent by volume of the drilling fluid and may be at least about 5 percent by volume of the drilling fluid.

The oil-based drilling fluid of compositions of this invention may further include a weight material. The quantity and nature of the weight material depends upon the desired density and viscosity of the final fluid. The examples of the weight material that may be used are barite, iron oxides, manganese oxides, calcium carbonate and similar such materials that should be known to one of skill in the art. The amount of weight material added to any particular drilling fluid will necessarily depend upon the components and the desired density. In one illustrative embodiment the amount of weight material is sufficient to give a drilling fluid having a density up to about 24 pounds per gallon and preferably weight materials may be added to give a density of up to about 19.5 pounds per gallon.

Fluid loss control agents may also be included in the formulation of drilling fluids in accordance with this invention. Suitable fluid loss control agents include modified lignite, polymers, oxidized asphalt, gilsonite, humates prepared by reacting humic acid with amides or polyalkyl polyamines, and other conventional fluid loss control agents. The amount of fluid loss control agent may vary depending upon the end use of the fluid and properties of the fluid desired. Typically, fluid loss control agents are added in amounts less than about 10% by weight and preferably in amounts less than about 5% by weight/volume of the drilling fluid.

The method of preparing the drilling fluid is not particularly critical so long as the components of the drilling fluid are mixed and well dispersed within the fluid. Generally the components may be mixed together in any order under agitation. One representative method of preparing the oil-based drilling fluid of the present invention includes mixing an appropriate quantity of oleaginous fluid and an appropriate quantity of amine surfactant together with continuous mild agitation. Upon complete mixing, the other surfactant and drilling fluids components described above may be added. If weight material, such as those described above, are to be added, then the weight material is typically added after all other components are mixed.

A person of ordinary skill in the art should appreciate the usefulness of the above described drilling fluids in the drilling of subterranean wells. Thus one embodiment of the present invention is the use of the above drilling fluid and invert emulsions including the drilling fluid of the present invention in the drilling, completion and workover of oil and gas wells. Such operations and use should be well known to one of skill in the art of drilling fluids and drilling subterranean wells in general.

As used herein, the term "non-oleaginous liquid" means any substance which may be a liquid at 25° C. and which is not an oleaginous liquid as defined above. Non-oleaginous liquids are immiscible with oleaginous liquids but capable of forming emulsions therewith. Typical non-oleaginous liquids include aqueous solutions such as, fresh water, sea water or brine containing inorganic or organic dissolved salts, as well as, aqueous solutions containing water-miscible organic compounds. In one embodiment of this invention, brines, such as calcium chloride, calcium bromide, zinc bromide or combinations thereof may be utilized to form invert emulsions. Other transition metal salts may demonstrate utility in this invention, for instance zinc chloride, and related materials. One distinct advantage of the use of these materials is the ability to build weight in drilling fluids without adding solid weighting materials, such as those described above.

The amount of non-oleaginous liquid in the invert emulsion fluid may vary depending upon the particular non-oleaginous fluid used and the particular application in which the invert emulsion fluid is to be employed. The amount should not be so great that it cannot be dispersed in the oleaginous phase. Therefore, typically the amount of non-oleaginous liquid may be less than about 90, preferably less than about 80, more preferably less than about 70 percent by volume of the total fluid.

In view of the above disclosure, one illustrative embodiment of the present invention may be an oil-based drilling fluid including an oleaginous liquid and an amine surfactant, the surfactant being present in amounts sufficient to stabilize the rheology and the HTHP fluid loss properties of said oil-based drilling fluid in the presence of acidic gases. A preferred embodiment of the oil-based drilling fluid described above, the amine surfactant has the general formula:

$$RNH_2$$

wherein R represents a $C_{12}$–$C_{22}$ alkyl group, a $C_{12}$–$C_{22}$ alkenyl group or alkyl substituted cyclo alkyl group and more preferably R represents a straight or branched $C_{12}$–$C_{22}$ alkyl group, mixtures and unsaturated derivatives thereof. Such oil-based drilling fluids may further include a weighting agent in a sufficient amount to give a drilling fluid having a density up to about 24 pounds per gallon. The illustrative oil-based drilling fluid may optionally include a viscosifying agent present in an amount of at least 0.01 percent by weight/volume of said drilling fluid. The oleaginous fluid of the illustrative oil-based drilling fluid may be a natural or synthetic oil and preferably the oleaginous fluid may be selected from diesel oil, vegetable oil, animal oil, mineral oil, polyalphaolefins, long chain internal olefins, linear alpha olefins, silicone based fluids, linear paraffin oils, iso paraffin oils, or combinations thereof. One of skill in art would appreciate that the oleaginous fluid may be the major component by volume of said illustrative drilling fluid. The illustrative oil-based drilling fluid may further include a surfactant which may be selected from fatty acids, soaps of fatty acids, amido-amines, polyamides, polyamines, imidazoline derivatives, alkanol amides, oleate esters, organic phosphate esters, oxidized crude-tall oil, alkyl aromatic sulfonates and sulfates, or combinations and mixtures of these.

Another illustrative embodiment of the present invention may be an oil-based drilling fluid absent an alkaline reserve. Such a fluid would include an oleaginous liquid and an amine-surfactant which may be selected such that the surfactant stabilizes the rheology and the HTHP fluid loss properties of said oil-based drilling fluid in the presence of acidic gases despite the absence of said alkaline reserve. The amine surfactant may have the general formula:

$$RNH_2$$

wherein R may represent a $C_{12}$–$C_{22}$ alkyl group, a $C_{12}$–$C_{22}$ alkenyl group or alkyl substituted cyclo alkyl group or alternatively R may represent a straight or branched $C_{12}$–$C_{22}$ alkyl group, mixtures and unsaturated derivatives thereof. Such an illustrative oil-based drilling fluid may further include a weighting agent, said weighting agent may be present in an amount sufficient to give a drilling fluid having a density up to about 24 pounds per gallon. Optionally, the illustrative oil-based drilling fluid may include a viscosifying agent which may be present in an amount of at least 0.01 percent by weight/volume of said drilling fluid.

In one embodiment of the illustrative oil-based drilling fluid the oleaginous fluid may be a natural or synthetic oil preferably selected from diesel oil, vegetable oil, animal oil, mineral oil, polyalphaolefins, long chain internal olefins, linear alpha olefins, silicone based fluids, linear paraffin oils, iso paraffin oils, or combinations thereof. In addition to the previously listed components and optional components, the illustrative oil-based drilling fluid may further include a surfactant, said surfactant being selected from fatty acids, soaps of fatty acids, amido-amines, polyamides, polyamines, imidazoline derivatives, alkanol amides, oleate esters, organic phosphate esters, oxidized crude-tall oil, alkyl aromatic sulfonates and sulfates, or combinations and mixtures of these.

The present invention also contemplates the use of the drilling fluids of the present invention in the formation of invert emulsions. Invert emulsions should be well known to one of skill in the art of drilling fluids and oil-based drilling fluids in particular, Thus one such illustrative invert emulsion drilling fluid should be suitable for use in drilling oil and gas wells in oil fields in which acidic gases may be encountered. Such an invert emulsion drilling fluid includes an oleaginous fluid, a non-oleaginous fluid, and an amine surfactant. The amine surfactant should be present in amounts sufficient to stabilize the rheology and the HTHP fluid loss properties of said oil-based drilling fluid in the presence of acidic gases. In one such illustrative invert emulsion, the oleaginous fluid may be selected from diesel oil, vegetable oil, animal oil, mineral oil, polyalphaolefins, long chain internal olefins, linear alpha olefins, silicone based fluids, linear paraffin oils, iso paraffin oils, or combinations thereof, the non-oleaginous fluid may be an aqueous solution selected from fresh water, sea water, organic and inorganic salt solutions and brines, and mixtures thereof, and the amine surfactant has the general formula:

$$RNH_2$$

wherein R represents a $C_{12}$–$C_{22}$ alkyl group, a $C_{12}$–$C_{22}$ alkenyl group or alkyl substituted cyclo alkyl group. Such an illustrative invert emulsion drilling fluid may further include a weighting agent which may be present in an amount sufficient to give a invert emulsion drilling fluid a density up to about 24 pounds per gallon. Optionally, the illustrative invert emulsion drilling fluid may include a viscosifying agent which may be present in an amount of at least 0.01 percent by weight/volume of said drilling fluid. In addition to the previously listed components and optional components, an illustrative invert emulsion drilling fluid may further include a surfactant, said surfactant being selected from fatty acids, soaps of fatty acids, amido-amines, polyamides, polyamines, imidazoline derivatives, alkanol amides, oleate esters, organic phosphate esters, oxidized crude-tall oil, alkyl aromatic sulfonates and sulfates, or combinations and mixtures of these.

Another illustrative invert emulsion drilling fluid of the present invention may be absent an alkaline reserve and thus may be suitable for use in drilling oil and gas wells in oil fields in which acidic gases may be encountered. Such an illustrative invert emulsion drilling fluid may include an oleaginous fluid, a non-oleaginous fluid, and an amine surfactant, wherein said amine surfactant may be selected such that said amine surfactant stabilizes the rheology and the HTHP fluid loss properties of said invert emulsion drilling fluid in the presence of acidic gases despite the absence of said alkaline reserve. In one such illustrative invert emulsion, the oleaginous fluid may be selected from diesel oil, vegetable oil, animal oil, mineral oil, polyalphaolefins, long chain internal olefins, linear alpha olefins, silicone based fluids, linear paraffin oils, iso paraffin oils, or combinations thereof, the non-oleaginous fluid may be an aqueous solution selected from fresh water, sea water, organic and inorganic salt solutions and brines, and mixtures thereof, and the amine surfactant has the general formula:

$$RNH_2$$

wherein R represents a $C_{12}$–$C_{22}$ alkyl group, a $C_{12}$–$C_{22}$ alkenyl group or alkyl substituted cyclo alkyl group. Such an illustrative invert emulsion drilling fluid may further include a weighting agent which may be present in an amount sufficient to give a invert emulsion drilling fluid a density up to about 24 pounds per gallon. Optionally, the illustrative invert emulsion drilling fluid may include a viscosifying agent which may be present in an amount of at least 0.01 percent by weight/volume of said drilling fluid. In addition to the previously listed components and optional components, an illustrative invert emulsion drilling fluid may further include a surfactant, said surfactant being selected from fatty acids, soaps of fatty acids, amido-amines, polyamides, polyamines, imidazoline derivatives, alkanol amides, oleate esters, organic phosphate esters, oxidized crude-tall oil, alkyl aromatic sulfonates and sulfates, or combinations and mixtures of these.

The present invention may also be directed to a method of logging $CO_2$ and $H_2S$ acidic gases during the drilling a subterranean well in which $CO_2$ and $H_2S$ acidic gases are encountered. Such a method includes: formulating an alkaline-reserve-free drilling fluid, as substantially disclosed herein; drilling a subterranean well with such a fluid and determining the content of the acidic gases present in the drilling fluid. Such determinations may be made by gas chromatography, titration, precipitation/gravimetric techniques, and other methods which should be known to one of skill in the art.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

General Information Relevant to the Examples

These tests were conducted in accordance with the appropriate published API procedures and in particular in API Bulletin RP 13B-2, 1990, the contents of which are hereby incorporated herein by reference. The following abbreviations are used in describing the following examples:

"PV" is plastic viscosity which may be one variable used in the calculation of viscosity characteristics of a drilling fluid, measured in centipoise (cp) units. "YP" is yield point which may be another variable used in the calculation of viscosity characteristics of drilling fluids, measured in pounds per 100 square feet (lb/100 ft$^2$).

"GELS" is a measure of the suspending characteristics, or the thixotropic properties of a drilling fluid, measured in pounds per 100 square feet (lb/100 ft$^2$). "E.S." is electrical stability of the emulsion as measured by the test described in *Composition and Properties of Drilling and Completion Fluids*, 5th Edition, H. C. H. Darley, George R. Gray, Gulf Publishing Company, 1988, pp. 116, the contents of which are hereby incorporated by reference. Generally, the higher the number, the more stable the emulsion.

"AV" is apparent viscosity which may be another variable used in the calculation of viscosity characteristic of drilling fluid, measured in centipoise (cp) units.

"GELS" is a measure of the suspending characteristics, or the thixotropic properties of a drilling fluid, measured in pounds per 100 square feet (lb/100 ft2).

"API F.L." is the term used for API filtrate loss in milliliters (ml).

"HTHP" is the term used for high temperature high pressure fluid loss, measured in milliliters (ml) according to API bulletin RP 13 B-2, 1990.

In the tables given below, the following names and trade names are used and are well known in the art of drilling fluids:

| | |
|---|---|
| Claytone 38 HDG | Organophillic clay from Southern Clay Products |
| VERSACOAT I | Emulsifier from M-I L.L.C. |
| VERSAWET I | Surfactant from M-I L.L.C. |
| VERSATROL I | Gilsonite based fluid loss control agent |
| Saraline 200 | Paraffinic oil from Shell |
| DG-55 | Viscosifying clay from M-I L.L.C. |
| THIX-L | Polymeric gelling viscosity agent from M-I L.L.C. |
| EMI-521 | Primary amine surfactant from M-I L.L.C. |
| EMI-526 | Fluid loss control/viscosifying agent from M-I L.L.C. |
| RevDust | Simulated drilling solids |
| VERSA VB | Emulsifier from M-I L.L.C. |

EXAMPLE 1

Fluid illustrative of the present invention were formulated without the presence of either water or lime as components according to the following formulations:

| Formulation | 1 | 2 | 3 | 4 |
|---|---|---|---|---|
| Saraline 200, ml | 237.9 | 237.9 | 237.9 | 237.9 |
| VERSACOAT I | 5 | 5 | 5 | 5 |
| VERSAWET I | 3 | 3 | 3 | 3 |
| Clayton 38 HDG | 8 | 8 | 8 | 8 |
| VERSATROL I | 20 | 20 | 20 | 20 |
| THIX-L | 6 | 6 | 6 | 6 |
| DG-55 | 10 | 10 | 10 | 10 |
| EMI-521 | — | 4 | — | 4 |
| Barite | 311 | 311 | 311 | 311 |
| EMI-526 | — | — | 2 | 2 |

The resulting muds were heat aged at 180° F. for 16 hours. The muds were then stirred for 15 minutes and subsequently heat aged at 400° F. for 72 hours rotating with 300 psi $CO_2$ in bomb. The resulting muds had the following properties:

| Aged Mud Properties | | | | |
|---|---|---|---|---|
| Formulation | 1 | 2 | 3 | 4 |
| 600 @ 150° C. | 109 | 180 | 121 | 201 |
| 300 | 65 | 118 | 74 | 131 |
| 200 | 50 | 94 | 56 | 103 |
| 100 | 31 | 63 | 35 | 69 |
| 6 | 7 | 18 | 10 | 18 |
| 3 | 6 | 15 | 8 | 15 |
| Gels 10"/10' | 15/74 | 33/116 | 18/80 | 31/135 |
| PV | 44 | 62 | 47 | 70 |
| YP | 21 | 56 | 27 | 61 |
| HTHP @ 300° F. | — | 38 | 4.6 | — |

Upon review, one of skill in the art should recognize that the above results indicate that fluids useful in the drilling of subterranean wells can be prepared using the principles of this invention. Further, one of skill in the art should recognize that the muds formulated in accordance with the present invention, absent of lime and water, maintain properties suitable for drilling muds in the presence of heat and high pressure carbon dioxide. For samples with and without EMI-526, the addition of EMI-521 increases the rheology and gel strength.

EXAMPLE 2

Fluids illustrative of the present invention were formulated as follows:

| Aged Mud Properties | |
|---|---|
| Formulation | 5 |
| Saraline 200, ml | 237.9 |
| Clayton 38 HDG | 10 |
| EMI-521 | 4 |
| EMI-526 | 20 |
| THIX-L | 0 |
| Barite | — |

The above muds were heat aged at 180° F. for 16 hours, the resulting fluids possessed the following properties:

| Aged Mud Properties | |
|---|---|
| Formulation | 5 |
| 600 @ 150° F. | 107 |
| 300 | 78 |
| 200 | 62 |
| 100 | 42 |
| 6 | 7 |
| 3 | 6 |
| Gels 10"/10' | 7/15 |
| PV | 29 |
| YP | 49 |
| HTHP @ 300° F. | — |

The above aged muds were stirred 15 minutes and subsequently heat aged at 400° F. for 72 hours and under an atmosphere of 300 psi $CO_2$ and without $CO_2$ rotating. The resulting fluids had the following properties.

| Aged Mud Properties | | |
| --- | --- | --- |
| Formulation | 5A | 5B |
| $CO_2$ 300 psi | YES | NO |
| 600 @ 150° F. | 300+ | 255 |
| 300 | 300+ | 190 |
| 200 | 300+ | 168 |
| 100 | 300+ | 144 |
| 6 | 180 | 110 |
| 3 | 122 | 102 |
| Gels 10"/10' | 110/— | 107/124 |
| PV | — | 65 |
| YP | — | 125 |
| HTHP @ 300° F. | — | 2.6 |

Upon review, one of skill in the art should recognize the above results indicate that fluids useful in the drilling of subterranean wells can be prepared using the principles of this invention. Further, one of ordinary skill in the art should appreciate that the muds of the present invention retain the properties desired in a drilling mud even after exposure to acidic gas (carbon dioxide) and elevated temperature. In the presence of EMI-521, $CO_2$ performed beneficially rather than detrimentally with respect to rheology.

EXAMPLE 3

Fluids illustrative of the present invention was formulated as follows:

| Formulation | 6 | 7 |
| --- | --- | --- |
| Saraline 200, ml | 237.9 | 237.9 |
| Claytone 38 HDG | 5 | 5 |
| EMI-521 | 2 | 2 |
| VERSACOAT I | 2 | 0 |
| VERSA VB | 0 | 2 |
| EMI-526 | 4 | 4 |
| VERSATROL I | 10 | 10 |
| RevDust | 10 | 10 |
| Barite | 311 | 311 |

The above formulations had the following properties:

| Unaged Mud Properties | | |
| --- | --- | --- |
| Formulation | 6 | 7 |
| 600 @ 150° F. | 32 | 38 |
| 300 | 17 | 22 |
| 200 | 11 | 16 |
| 100 | 7 | 11 |
| 6 | 2 | 5 |
| 3 | 2 | 4 |
| Gels 10"/10' | 6/13 | 7/11 |
| PV | 15 | 16 |
| YP | 2 | 6 |
| HTHP @ 300° F. | — | — |
| Settling | No | No |

The above mud formulations were heat aged at 380° F. for 16 hours. The resulting fluids had the following properties

| Heat Aged Mud Properties | | | | |
| --- | --- | --- | --- | --- |
| Formulation | 6A | 6B | 7A | 7B |
| 300 psi $CO_2$ | Yes | No | Yes | No |
| 600 @ 150° F. | 41 | 41 | 61 | 64 |
| 300 | 21 | 21 | 37 | 39 |
| 200 | 15 | 14 | 28 | 30 |
| 100 | 9 | 8 | 19 | 21 |
| 6 | 2 | 1 | 8 | 9 |
| 3 | 1 | 1 | 7 | 7 |
| Gels 10"/10' | 3/20 | 2/20 | 33/24 | 33/25 |
| PV | 1 | −1 | 13 | 14 |
| HTHP @ 300° F. | 16.0 | — | 9.0 | 14.0 |
| Settling | Slight | Yes | No | No |

Upon review, one of skill in the art should recognize that the above results indicate that fluids useful in the drilling of subterranean wells can be prepared using the principles of this invention. In addition, one of skill in the art would understand that in Example 3, the concentration of EMI-521 has been reduced to 2 ppb from the 4 ppb in Example 2. Either VERSACOAT I or VERSA VB emulsifiers replace that part of EMI-521. While the two supplemental emulsifiers produced differences in rheology, the effect of $CO_2$ on the heat aged rheology was minor for either supplementally treated emulsifier samples.

EXAMPLE 4

Fluids illustrative of the present invention were formulated without lime and water as follows:

| Formulation | 8 | 9 | 10 |
| --- | --- | --- | --- |
| Saraline 200, ml | 237.9 | 237.9 | 237.9 |
| Clayton 38 HDG | 5 | 5 | 5 |
| EMI-521 | 0 | 0 | 2 |
| VERSACOAT I | 4 | 2 | 2 |
| VERSA VB | 2 | 4 | 2 |
| EMI-526 | 4 | 4 | 4 |
| VERSATROL I | 10 | 10 | 10 |
| RevDust | 10 | 10 | 10 |
| Barite | 311 | 311 | 311 |

The above formulations had the following properties prior to heat aging:

| Unaged Mud Properties | | | |
| --- | --- | --- | --- |
| Formulation | 8 | 9 | 10 |
| 600 @ 150° F. | 39 | 40 | 38 |
| 300 | 24 | 24 | 23 |
| 200 | 17 | 18 | 17 |
| 100 | 12 | 13 | 12 |
| 6 | 5 | 6 | 4 |
| 3 | 4 | 5 | 4 |
| Gels 10"/10' | 7/11 | 7/30 | 7/12 |
| PV | 15 | 16 | 15 |
| YP | 9 | 8 | 8 |
| HTHP @ 300° F. | — | — | — |

The above muds were heat aged at 380° F. for 16 hours with rotation. The resulting fluids had the following properties:

| Aged Mud Properties | | | |
|---|---|---|---|
| Formulation | 8 | 9 | 10 |
| 600 @ 150° F. | 61 | 57 | 63 |
| 300 | 36 | 33 | 36 |
| 200 | 27 | 24 | 28 |
| 100 | 17 | 14 | 19 |
| 6 | 5 | 3 | 8 |
| 3 | 4 | 2 | 6 |
| Gels 10"/10' | 12/32 | 7/32 | 15/33 |
| PV | 25 | 24 | 27 |
| YP | 11 | 9 | 9 |
| HTHP @ 300° F. | 10.4 | 16.6 | 3.4 |

Upon review, one of skill in the art should recognize that the above results indicate that fluids useful in the drilling of subterranean wells can be prepared using the principles of this invention. In addition, one of skill in the art would understand that in Example 4, formulas 8, 9, and 10 each contain a total of 6 ppb emulsifiers. For Formula 10, 2 ppb EMI-521 is a component. The heat aged HTHP fluid loss for Formula 10 was reduced to 3.4 ml from 10.4 ml and 16.6 ml, respectively, for Formulas 8 and 9. Based on all foregoing formulas, the preferred formula is number 10.

EXAMPLE 5

Fluid illustrative of the present invention was formulated without lime and water as follows:

| Formulation | 11 |
|---|---|
| HDF 2000, ml | 237.9 |
| Clayton 38 HDG | 5 |
| EMI-521 | 2 |
| VERSACOAT I | 2 |
| VERSA VB | 2 |
| EMI-526 | 4 |
| VERSATROL I | 10 |
| Revdust | 10 |
| Barite | 311 |

All of the abbreviations in the above table are the same as previously used. In addition, HDF200 is an oleaginous fluid available from Total.

The above formulation had the following properties:

| Unaged Mud Properties | |
|---|---|
| Formulation | 11 |
| 600 @ 150° F. | 34 |
| 300 | 18 |
| 200 | 12 |
| 100 | 8 |
| 6 | 2 |
| 3 | 2 |
| Gels 10"/10' | 2/5 |
| PV | 16 |
| YP | 2 |
| HTHP @ 300° F. | — |

The above mud formulation was heat aged @ 400° F. for 72 hours. The resulting fluid had the following properties:

| Heat Aged Mud Properties | |
|---|---|
| Formulation | 11 |
| 600 @ 150° F. | 45 |
| 300 | 24 |
| 200 | 16 |
| 100 | 8 |
| 6 | 1 |
| 3 | 1 |
| Gels 10"/10' | 1/10 |
| PV | 21 |
| YP | 3 |
| HTHP @ 300° F. | 4.4 |

Upon review, one of skill in the art should recognize that the above results indicate that alkaline-reserve-free oil-based drilling fluids useful in the drilling of subterranean wells can be prepared using the principles of this invention. Further, in Formulation, No. 11, HDF 2000 was used as the oleaginous fluid instead of the Saraline 200 used in the previous examples. This illustrates that a wide variety of oleaginous fluids may be used successfully in present invention.

EXAMPLE 6

A fluid illustrative of the present invention was formulated without lime (Formulation 12) and was compared to a fluid formulated in a conventional manner including lime (Formulation 13). The components of each fluid are given below:

| Formulation | 12 | 13 |
|---|---|---|
| HDF 2000, ml | 192 | 192 |
| Clayton 38 HDG | 6 | 6 |
| EMI-521 | 2.5 | 0 |
| VERSACOAT I | 2.0 | 5.0 |
| VERSA VB | 2.0 | 0 |
| EMI-526 | 4.0 | 4.0 |
| VERSATROL I | 10.0 | 10.0 |
| Revdust | 10.0 | 10.0 |
| Barite | 311 | 311 |
| Water, ml | 12.6 | 12.6 |
| VERSAMUL I | 0 | 4 |
| VERSAWET I | 0 | 3 |
| Lime | 0 | 20 |

All of the abbreviations in the above table are the same as previously used.

Each fluid was weighed and the equivalent to 6.0 g of $CO_2$ was injected into both formulations prior to heat aging @ 400° F. for 72 hours in sealed containers. The samples were cooled, the pressure of gas released and then the samples were subsequently weighed. The following table presents illustrative results:

| Formulation | 12 | 13 |
|---|---|---|
| Initial weight | 5048.30 | 5060.10 |
| Weight w/CO2 | 5054.70 | 5066.10 |
| Weight after heat aging | 5048.80 | 5066.10 |

Upon review of the above, one of skill in the art should recognize that the carbon dioxide was absorbed via an acid base reaction with the lime and converted to calcium carbonate in Formulation 13. In contrast that fluid formulated in accordance with the present invention absorbed a negligible amount of the carbon dioxide gas. From such data one of skill in the art should understand that a person could, for example, take samples from the mud formulated in accordance with the present invention under pressure, relieve that pressure and measure the presence of carbon dioxide or other acidic gases. Further such a skilled person should appreciate that such a method could not be utilized with a conventional mud, such as Formulation 13, because there would be no way of determining the calcium carbonate generated by the presence of acidic gas down hole and the calcium carbonate that might be present as drill cuttings of limestone rock.

While the compositions and methods of this invention have been described in terms of illustrative and preferred embodiments, it will be apparent to those of skill in the art that variations may be applied to the process described herein without departing from the concept and scope of the invention. All such similar substitutes and modification apparent to those skilled in the art are deemed to be within the concept and scope of the invention as it is set out in the following claims.

What is claimed is:

1. An oil-based drilling fluid comprising
   an oleaginous liquid and an amine-surfactant, wherein said amine surfactant has the general formula:

$$RNH_2$$

wherein R represents a $C_{12}$–$C_{22}$ alkyl group, a $C_{12}$–$C_{22}$ alkenyl group or alkyl substituted cyclo alkyl group, and said surfactant being present in amounts sufficient to stabilize the rheology and the HTHP fluid loss properties of said oil-based drilling fluid in the presence of acidic gases.

2. The oil-based drilling fluid of claim 1 wherein said amine surfactant has the general formula:

$$RNH_2$$

wherein R represents a straight or branched $C_{12}$–$C_{22}$ alkyl group, mixtures and unsaturated derivatives thereof.

3. The oil-based drilling fluid of claim 1 further comprising a weighting agent, said weighting agent is present in an sufficient to give a drilling fluid having a density up to about 24 pounds per gallon.

4. The oil-based drilling fluid of claim 1 further comprising a viscosifying agent, said viscosifying agent being present in an amount of at least 0.01 percent by weight/volume of said drilling fluid.

5. The oil-based drilling fluid of claim 1 wherein said oleaginous fluid is a natural or synthetic oil.

6. The oil-based drilling fluid of claim 1 wherein said oleaginous fluid is selected from diesel oil, vegetable oil, animal oil, mineral oil, polyalphaolefins, long chain internal olefins, linear alpha olefins, silicone based fluids, linear paraffin oils, iso paraffin oils, or combinations thereof.

7. The oil-based drilling fluid of claim 1 wherein said oleaginous fluid is the major component by volume of said drilling fluid.

8. The oil-based drilling fluid of claim 1 further comprising a surfactant, said surfactant being selected from fatty acids, soaps of fatty acids, amido-amines, polyamides, polyamines, imidazoline derivatives, alkanol amines, oleate esters, organic phosphate esters, oxidized crude-tall oil, alkyl aromatic sulfonates and sulfates, or combinations and mixtures of these.

9. An oil-based drilling fluid absent an alkaline reserve, said fluid comprising
   an oleaginous liquid and
   an amine-surfactant,
   wherein said surfactant is selected such that said surfactant stabilizes the rheology and the HTHP fluid loss properties of said oil-based drilling fluid in the presence of acidic gases despite the absence of said alkaline reserve.

10. The oil-based drilling fluid of claim 9 wherein said amine surfactant has the general formula:

$$RNH_2$$

wherein R represents a $C_{12}$–$C_{22}$ alkyl group, a $C_{12}$–$C_{22}$ alkenyl group or alkyl substituted cyclo alkyl group.

11. The oil-based drilling fluid of claim 9 wherein said amine surfactant has the general formula:

$$RNH_2$$

wherein R represents a straight or branched $C_{12}$–$C_{22}$ alkyl group, mixtures and unsaturated derivatives thereof.

12. The oil-based drilling fluid of claim 11 further comprising a weighting agent, said weighting agent is present in an sufficient to give a drilling fluid having a density up to about 24 pounds per gallon.

13. The oil-based drilling fluid of claim 12 further comprising a viscosifying agent, said viscosifying agent being present in an amount of at least 0.01 percent by weight/volume of said drilling fluid.

14. The oil-based drilling fluid of claim 13 wherein said oleaginous fluid is a natural or synthetic oil.

15. The oil-based drilling fluid of claim 14 wherein said oleaginous fluid is selected from diesel oil, vegetable oil, animal oil, mineral oil, polyalphaolefins, long chain internal olefins, linear alpha olefins, silicone based fluids, linear paraffin oils, iso paraffin oils, or combinations thereof.

16. The oil-based drilling fluid of claim 15 further comprising a surfactant, said surfactant being selected from fatty acids, soaps of fatty acids, amido-amines, polyamides, polyamines, imidazoline derivatives, alkanol amines, oleate esters, organic phosphate esters, oxidized crude-tall oil, alkyl aromatic sulfonates and sulfates, or combinations and mixtures of these.

17. A method for logging acidic gases in a drilling fluid which encounters such gases during the drilling of a subterranean well the drilling fluid, the method comprising: formulating an alkaline-reserve-free drilling fluid, the drilling fluid including an oleaginous liquid and an amine-surfactant, said surfactant being present in amounts sufficient to stabilize the rheology and the HTHP fluid loss properties of said oil-based drilling fluid in the presence of acidic gases; drilling said subterranean well with said drilling fluid; and determining the acidic gas content of said drilling fluid.

* * * * *

UNITED STATES PATENT AND TRADEMARK OFFICE
CERTIFICATE OF CORRECTION

PATENT NO. : 5,909,779
DATED : June 8, 1999
INVENTOR(S) : Arvind D. Patel; Jayanti S. Patel; Harris A. Oehler It is certified that error appears in the above-identified patent and that said Letters Patent is hereby corrected as shown below:

At Col. 10, line 44, please delete "-" and replace it with --311--.

Signed and Sealed this

Second Day of November, 1999

Attest:

Q. TODD DICKINSON

Attesting Officer

Acting Commissioner of Patents and Trademarks